(No Model.)
L. G. WOOLLEY.
Electro Magnetic Motor.
No. 231,697.  Patented Aug. 31, 1880.
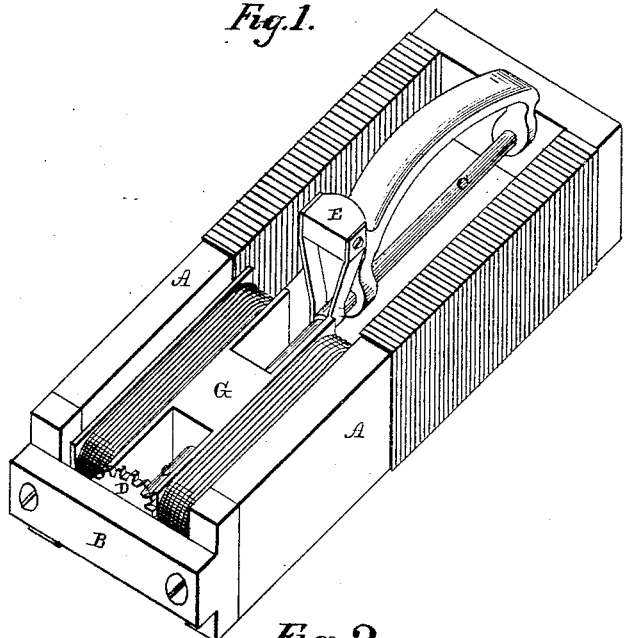
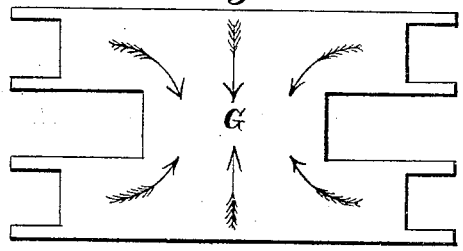
Witnesses=
W. W. Mortimer
C. H. Isham
Inventor=
L. G. Woolley,
per
F. A. Lehmann,
Atty

UNITED STATES PATENT OFFICE.

LEONIDAS G. WOOLLEY, OF MENDON, MICHIGAN.

ELECTRO-MAGNETIC MOTOR.

SPECIFICATION forming part of Letters Patent No. 231,697, dated August 31, 1880.

Application filed June 11, 1880. (No model.)

*To all whom it may concern:*

Be it known that I, LEONIDAS G. WOOLLEY, of Mendon, in the county of St. Joseph and State of Michigan, have invented certain new and useful Improvements in Electro-Magnetic Motors; and I do hereby declare the following to be a full, clear, and exact description of the invention, such as will enable others skilled in the art to which it pertains to make and use it, reference being had to the accompanying drawings, which form part of this specification.

My invention relates to an improvement in electro-magnetic motors; and it consists in a revolving magnet which is wider than it is long, and which is cut away at the center of each of its sides where the shaft passes through, so as to make its polar ends about three times as broad as the central part through which the shaft passes, the ends of the magnet being grooved, so as to receive the wire which is wrapped around them, as will be more fully described hereinafter.

As is well known, a very broad and short electro-magnet is magnetized and demagnetized much quicker than a long and narrow one; but the power of the former is not nearly so great as that of the latter, on account of the magnetism in a very broad and short magnet focusing and concentrating itself in both sides or portions at right angles to its polar ends.

A very broad magnet-core, when wound with insulated wire, forms a helix that presents a great deal of wire surface at the extreme polar ends of the core. A helix of this shape, when charged with electricity and brought near the poles of another magnet, produces within itself considerable electrical attraction or repulsion, as well as serving to magnetize the iron core, which produces a much greater power.

In the construction of an electro-magnetic motor it is of great importance to produce a magnet that will be very active and quick, or, in other words, receive and discharge its maximum force very rapidly, so there will be little or no "back-pull," and at the same time electro-magnets should be so built as to attract or repel with as much force as possible.

The object of my invention is to so shape a revolving magnet that it shall be much broader at the ends than it is long, and thus prevent the magnetism from focusing and concentrating itself on both sides or portions at right angles to its polar ends.

In the accompanying drawings, Figure 1 is a perspective of a motor embodying my invention. Fig. 2 is a plan view of the magnet G alone.

A represents a U-shaped permanent or electro magnet, and which has its two outer ends united together by means of the non-magnetic piece B, which forms a bearing at that end for the shaft C. This shaft, as will be seen, extends midway between the two poles of this magnet for its full length, and has a wheel, D, secured to it at one end for transmitting the motion of the shaft to any suitable mechanism, and has secured to its other end a pole-changer, E, of any desired construction. This pole-changer is pivoted upon the shaft, and can be moved from side to side, so as to increase or decrease the speed of the motor, as may be desired. Secured to this shaft is the revolving magnet G, which has its two sides recessed, as shown, at that point where the shaft passes through it. The ends of this magnet extend considerably beyond that portion where the shaft passes through the center, and these ends thus formed are grooved, so as to receive the wire which is wrapped around them for the purpose of forming the helices.

When a current of electricity is passed around these helices the magnetism in both ends of the core becomes equally distributed, instead of focusing or concentrating itself in both sides or portions at right angles to the polar ends, as is the case with very broad and short magnets.

The direction of the magnetism at the moment the current is sent around the helix is shown by the arrows in Fig. 2.

Having thus described my invention, I claim—

In an electro-magnetic motor, a revolving magnet having a greater width than length, and provided with widened polar ends, the said ends being grooved longitudinally for the purpose of receiving the wire helices, substantially as shown and described.

In testimony that I claim the foregoing I have hereunto set my hand this 4th day of June, 1880.

LEONIDAS G. WOOLLEY.

Witnesses:
CHAS. H. LEWIS,
A. H. ESTES.